United States Patent
Goodson et al.

(10) Patent No.: US 9,083,785 B2
(45) Date of Patent: Jul. 14, 2015

(54) SYSTEMS AND METHODS SELECTIVELY EXCLUDING TONES FROM VECTORING

(75) Inventors: Richard Goodson, Huntsville, AL (US); Arlynn Wayne Wilson, Huntsville, AL (US); Fred Chu, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 119 days.

(21) Appl. No.: 13/411,066

(22) Filed: Mar. 2, 2012

(65) Prior Publication Data

US 2012/0224683 A1  Sep. 6, 2012

Related U.S. Application Data

(60) Provisional application No. 61/448,546, filed on Mar. 2, 2011.

(51) Int. Cl.
| | |
|---|---|
| *H04M 9/08* | (2006.01) |
| *H04M 3/18* | (2006.01) |
| *H04W 24/02* | (2009.01) |
| *H04B 3/32* | (2006.01) |
| *H04M 3/34* | (2006.01) |
| *H04L 27/26* | (2006.01) |
| *H04L 12/70* | (2013.01) |
| *H04M 3/30* | (2006.01) |

(52) U.S. Cl.
CPC . *H04M 3/18* (2013.01); *H04B 3/32* (2013.01); *H04L 27/2601* (2013.01); *H04M 3/34* (2013.01); *H04W 24/02* (2013.01); *H04L 2012/5675* (2013.01); *H04M 3/306* (2013.01)

(58) Field of Classification Search
CPC ............ H04B 3/20; H04B 3/23; H04M 9/082
USPC ........................................ 379/406.01–406.16
See application file for complete search history.

(56) References Cited

U.S. PATENT DOCUMENTS

| 8,605,567 B2 | 12/2013 | Wilkes et al. |
| 2005/0152385 A1* | 7/2005 | Cioffi ............................ 370/420 |
| 2006/0274893 A1* | 12/2006 | Cioffi et al. .............. 379/399.01 |
| 2008/0188185 A1 | 8/2008 | Shi |

(Continued)

FOREIGN PATENT DOCUMENTS

WO  2011/009584  1/2011

OTHER PUBLICATIONS

Ginis, G., et al.: "Vectored Transmission for Digital Subscriber Line Systems"; IEEE Journal on Selected Areas in Communications, Jun. 1, 2002, pp. 1085-1101, vol. 20, No. 5, IEEE Service Center, Piscataway, US.

*Primary Examiner* — Simon Sing
(74) *Attorney, Agent, or Firm* — Maynard Cooper & Gale, P.C.; Jon E. Holland (57) ABSTRACT

A discrete multi-tone (DMT) transceiver communicates tones across a subscriber line. Vectoring is employed in an effort to reduce the effects of crosstalk. However, for some tones, such as tones significantly affected by radio frequency interference (RFI) or other forms of alien noise, vectoring may actually introduce distortions such that the vectoring degrades rather than improves overall signal quality. Control logic of the DMT transceiver is configured to sense when tones are affected by significant levels of alien noise and to exclude such tones from vectoring, thereby improving signal quality for such tones. The control logic also may lower the constellation densities of such tones in order to accommodate the vectoring exclusions applied to such tones.

16 Claims, 4 Drawing Sheets

(56) References Cited

U.S. PATENT DOCUMENTS

| | | | |
|---|---|---|---|
| 2009/0175156 A1* | 7/2009 | Xu | 370/201 |
| 2009/0207985 A1* | 8/2009 | Cioffi et al. | 379/93.01 |
| 2009/0285271 A1 | 11/2009 | Perez de Aranda Alonso et al. | |
| 2011/0007623 A1 | 1/2011 | Cendrillon et al. | |
| 2011/0007788 A1 | 1/2011 | Cendrillon et al. | |
| 2011/0026575 A1 | 2/2011 | Shalom et al. | |
| 2011/0096870 A1* | 4/2011 | Schenk et al. | 375/296 |
| 2011/0103574 A1* | 5/2011 | Anschutz et al. | 379/406.06 |

* cited by examiner

SYSTEMS AND METHODS SELECTIVELY EXCLUDING TONES FROM VECTORING

CROSS REFERENCE TO RELATED APPLICATION

This application claims priority to U.S. Patent Application No. 61/448,546, entitled "Generalized Vectoring Architecture" and filed on Mar. 2, 2011, which is incorporated herein by reference.

RELATED ART

A digital subscriber line access multiplexer (DSLAM) is a device that connects multiple subscriber lines to a high-speed network line using digital subscriber line (DSL) modulation formats across the subscriber lines. In the downstream direction, a DSLAM generally demultiplexes a high-speed data stream from a network across the subscriber lines, and in the upstream direction, a DSLAM generally multiplexes the data streams from the subscriber lines for transmission across the high-speed network line. A DSLAM can be installed at a variety of locations, such as at a network facility (e.g., a central office) or an intermediate point between a central office and one or more customer premises.

A variety of DSL formats have been used for the communication from a DSLAM to a customer premises. Very-high-bit-rate DSL (VDSL) is a solution that is attractive due to the relatively high data rates enabled by VDSL as compared to other DSL solutions. Indeed, first generation VDSL provides data transmission up to about 52 Mega-bits per second (Mbit/s) downstream and about 16 Mbit/s upstream. Second generation VDSL, sometimes referred to as VDSL2, provides up to about 100 Mbit/s simultaneously in the both the upstream and downstream directions. The VDSL line code is discrete multi-tone (DMT) modulation, which uses a sequence of equally spaced frequencies or tones, each of which is modulated using quadrature amplitude modulation (QAM).

Like several other DSL technologies, VDSL suffers from the effects of crosstalk. However, VDSL standards specify vectoring techniques that allow crosstalk cancellation, and such techniques have been employed to cancel the crosstalk among subscriber lines extending from a DSLAM to one or more customer premises in an effort to improve the performance of VDSL signals and allow for longer reaches. However, VDSL vectoring is processing intensive, and as the number of subscriber lines increases, the amount of processing required to cancel crosstalk from the signals carried by the subscriber lines increases exponentially.

In this regard, to cancel crosstalk, vector logic (sometimes referred to as a "vector engine") maintains a set of vectoring coefficients respectively corresponding to the coupling functions between interfering tones (i.e., tones that induce crosstalk) and victim tones (i.e., tones affected by crosstalk). For each victim tone, the vector engine combines the symbol of the victim tone and each interfering tone with its corresponding vectoring coefficient, and the result becomes the new victim tone. In such manner, the crosstalk channel is effectively inverted, and the crosstalk is cancelled tone-by-tone for all tones. For transmitter-based precoding, the new victim tone is transmitted on the line, and the precoding effectively cancels the crosstalk as the victim tone propagates across the line and the crosstalk couples into the line of the victim tone. For receiver-based cancellation, the new tone is further processed by the receiver but with reduced crosstalk.

While the vectoring operations help to reduce crosstalk, the communicated signals are still vulnerable to other types of noise, such as radio frequency interference (RFI). Techniques for mitigating the effects of noise in order to improve signal quality are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for selectively excluding tones from vectoring. In one exemplary embodiment, a discrete multi-tone (DMT) transceiver communicates tones across a subscriber line. Vectoring is employed in an effort to reduce the effects of crosstalk. However, for some tones, such as tones significantly affected by radio frequency interference (RFI) or other forms of alien noise, vectoring may actually introduce additional noise such that the vectoring degrades rather than improves overall signal quality. Control logic of the DMT transceiver is configured to sense when tones are affected by significant levels of alien noise and to exclude such tones from vectoring, thereby improving signal-to-noise quality for such tones. The control logic also may lower the constellation densities of such tones in order to accommodate the vectoring exclusions applied to such tones.

Figure 1:
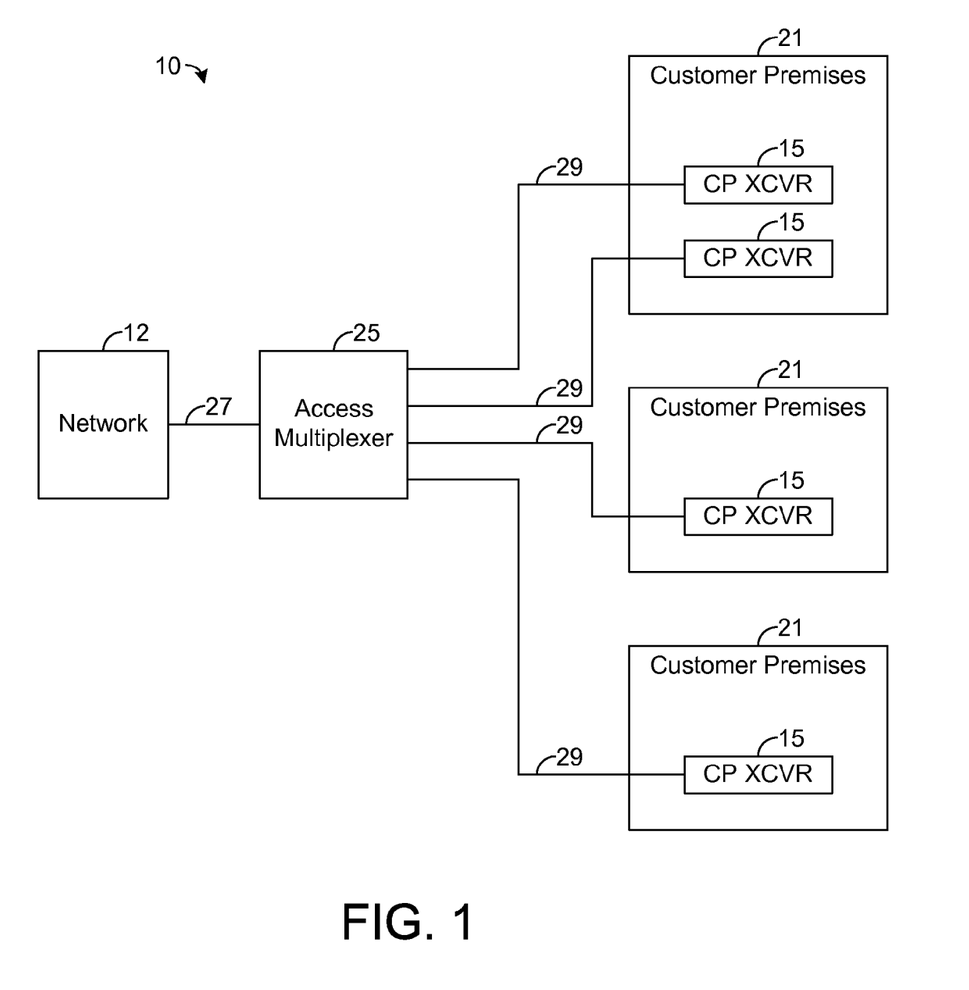
FIG. 1 is a block diagram illustrating an exemplary embodiment of a communication system.

FIG. 1 depicts an exemplary embodiment of a communication system 10. As shown by FIG. 1, the system 10 comprises a network 12, such as the public switched telephone network (PSTN) or other communication network, configured to communicate with CP transceivers 15 at one or more customer premises 21. In this regard, the network 12 is coupled to an access multiplexer (MUX) 25 (e.g., a digital subscriber line access multiplexer (DSLAM)) via a network line 27, such as one or more twisted-wire pairs or optical fibers, and the access multiplexer 25 is coupled to the CP transceivers 15 via a plurality of subscriber lines 29, such as twisted-wire pairs or optical fibers. For simplicity, FIG. 1 depicts four subscriber lines 29, but there can be any number of subscriber lines 29 in other embodiments. Further, the lines 29 in FIG. 3 extend to multiple customer premises 21, but it is also possible for the lines 29 to extend to a single customer premises 21.

In a downstream direction, the access multiplexer 25 receives a high-speed data stream from the network 12 via the network line 27 and forwards packets from the high-speed data stream across the plurality of subscriber lines 29. In an upstream direction, the access multiplexer 25 receives data streams from the customer premises 21 via the subscriber lines 29 and transmits packets from such data streams across the network line 27 to the network 12.

In one exemplary embodiment, the network line 27 comprises an optical fiber, and optical modulation formats are used to communicate data across the fiber. In addition, each subscriber line 29 comprises at least one twisted-wire pair, and digital subscriber line (DSL) modulation formats are used to communicate data across the subscriber lines 29. Note that there are a variety of DSL modulation formats that may be used for communicating data across the subscriber lines 29, such as asymmetric DSL (ADSL), high-bit-rate DSL (HDSL), very-high-bit-rate DSL (VDSL), and single-pair HDSL (SHDSL). For illustrative purposes, it will be assumed hereafter that the modulation format used for each subscriber line is VDSL, such as first generation VDSL or VDSL2, but it should be emphasized that other DSL and/or non-DSL modulation formats may be used in other embodiments.

Figure 2:
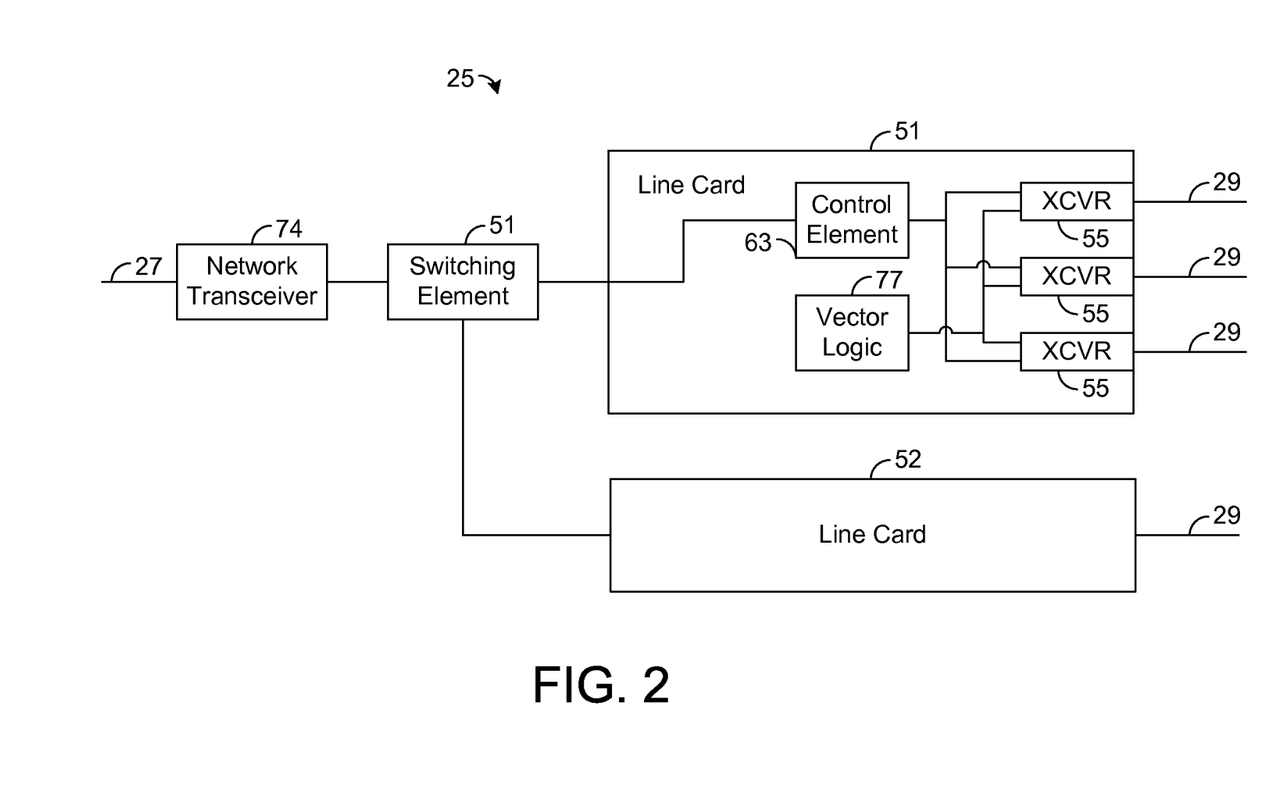
FIG. 2 is a block diagram illustrating an exemplary embodiment of an access multiplexer, such as is depicted by FIG. 1.

FIG. 2 depicts an exemplary embodiment of the access multiplexer 25. The access multiplexer 25 comprises a plurality of line cards 51 and 52 coupled to the subscriber lines 29. In this regard, as shown by FIG. 2, a line card 51 has at least one transceiver (XCVR) 55 coupled to at least one subscriber line 29. In the exemplary embodiment shown by FIG. 2, the line card 51 has three transceivers 55 respectively coupled to three subscriber lines 29, but the line card 51 may have any number of transceivers 55 and/or be coupled to any number of subscriber lines 29 in other embodiments. As will be described in more detail hereafter, each transceiver 55 is a member of the same vectoring group, but it is unnecessary for all of the transceivers 55 to be members of the same vectoring group in other embodiments. As known in the art, a vectoring group generally refers to a set of transceivers and associated subscriber lines for which vector logic is capable of canceling crosstalk that couples from any one line into any other line. In one exemplary embodiment, the components of the line card 51 reside on a single printed circuit board (PCB), but it is possible for more than one PCB to be used, if desired.

As shown by FIG. 2, the line card 51 has a card control element 63 that is coupled to each transceiver 55. The card control element 63 controls the general operation of the line card 51, including the forwarding of data packets, as will be described in more detail hereafter. The card control element 63 may be implemented in hardware, software, firmware, or any combination thereof. The card control element 63 is also coupled to a switching element 71, and the switching element 71 is coupled to a network transceiver 74 that is coupled to the network line 27. The switching element forwards packets between the network transceiver and the line card 51 and 52. Note that the line card 52 may be configured and operate similar to the line card 51. In other embodiments, any number of line cards may be implemented in the access multiplexer and coupled to the switching element 71.

In the downstream direction, assuming that the network line 27 comprises an optical fiber, the network transceiver 74 receives an optical data signal from the network line 27 and converts the optical data signal into an electrical signal comprising data packets. The switching element 71 selectively forwards the packets to the line cards 51 and 52 using conventional switching techniques known in the art. Each data packet received by the line card 51 is processed by the card's control element 63, which forwards the packet to at least one transceiver 55 for transmission across at least one subscriber line 29. When a transceiver 55 receives data packets from the card control element 63, the transceiver 55 modulates a carrier signal with the data packets using VDSL or some other desired modulation format in order to form a data signal that is transmitted across the subscriber line 29 coupled to such transceiver 55.

In the upstream direction, the transceivers 55 receive modulated data signals from the subscriber lines 29. For a given signal received by a given transceiver 55, the transceiver 55 demodulates the received signal to recover data packets. The transceiver 55 forwards the data packets to the card control element 63, and the card control element 63 sends each packet received from the card's transceivers 55 to the switching element 71, which forwards packets received from each of the cards 51 and 52 to the network transceiver 74. Assuming that the network line 27 comprises an optical fiber, the network transceiver 74 converts the data stream from the control element 63 into an optical data signal for transmission across the network line 27 to the network 12 (FIG. 1).

As shown by FIG. 2, the line card 51 comprises vector logic 77 (e.g., one or more vector engines) configured to perform vectoring in order to cancel crosstalk from the tones transmitted and/or received by the card 51. For example, the vector logic 77 maintains vectoring coefficients for the tones communicated (i.e., transmitted or received) by the transceivers 55. Via known techniques, the vector logic 77 uses such vectoring coefficients to estimate crosstalk that affects the received tones or that will affect tones to be transmitted so that such crosstalk can be cancelled.

For example, the vector logic 77 stores sets of vectoring coefficients respectively corresponding to the tones communicated across the subscriber lines 29 coupled to the card 51. For a given tone, referred to in this example as "victim tone," received by one of the transceivers 55 from one of the subscriber lines 29, the corresponding set of vectoring coefficients includes vectoring coefficients respectively associated with the tones, referred to as "interfering tones," that interfere with the victim tone. Upon receiving a set of symbols simultaneously communicated across the subscriber lines 29, the transceivers 55 send such symbols to the vector logic 77. For each interfering tone, the vector logic 77 combines (e.g., multiplies) the tone's symbol with the associated vectoring coefficient to estimate an amount of crosstalk interference from the interfering tone affecting the victim tone. The vector logic 77 then cancels such crosstalk interference from the symbol of the victim tone by combining (e.g., subtracting) the estimate with the symbol of the victim tone. The vector logic 77 performs the same process for the symbols of the other interfering tones in order to cancel, tone-by-tone, crosstalk interference in the victim tone.

After removing the crosstalk interference induced by the interfering tones, the vector logic 77 sends the symbol of the victim tone back to the transceiver 55 that originally received it from a subscriber line 29. Such transceiver 55 decodes the symbol and generates an error signal indicating an error estimate for the symbol. The foregoing transceiver 55 sends the error signal to the vector logic 77, which adaptively updates the set of vectoring coefficients corresponding to the victim tone based on the error signal using a known coefficient update algorithm, such as least means square (LMS).

Thus, the vector logic 77 cancels, from the symbol of the victim tone, crosstalk induced by each interfering tone received by the card 51 from the subscriber lines 29. Further, the vector logic 77 uses similar techniques to precode the symbols transmitted by the transceivers 55 across the subscriber lines 29 such that crosstalk is cancelled as the symbols propagate across the subscriber lines 29.

Specifically, the vector logic 77 receives symbols of interfering tones to be communicated across the lines 29 at the same time as a symbol of a victim tone to be communicated. For each interfering tone, the vector logic 77 combines (e.g., multiplies) the tone's symbol with the associated vectoring coefficient to estimate an amount of crosstalk interference that will affect the symbol of the victim tone. The vector logic 77 then combines (e.g., subtracts) the estimate from the symbol of the victim tone in order to precode the symbol so that crosstalk interference from the interfering tone is effectively cancelled during communication as it couples into the line 29 of the victim tone. The vectoring coefficients used for the precoding are updated based on the error associated with the victim tone, as determined by the CP transceiver 15 (FIG. 1) that receives the victim tone. Exemplary techniques for performing vectoring, including symbol precoding, are described in commonly-assigned U.S. patent application Ser. No. 13/016,680, entitled "Systems and Methods for Cancelling Crosstalk in Satellite Access Devices" and filed on Jan. 28, 2011, which is incorporated herein by references. Note that the vector logics 77 of the other line cards 52 and 53 are configured similar to the vector logic 77 of the line card 51 in order to cancel crosstalk affecting the tones communicated by the lines cards 52 and 53, respectively.

Prior to communicating data with a CP transceiver 15 (FIG. 1) in a data phase, each transceiver 55 (FIG. 2) of the access multiplexer 25 is configured to enter into a training phase in which the transceiver 55 and its corresponding CP transceiver 15 negotiate a data rate to be used in the subsequent data phase. Generally, the transceivers 15 and 55 negotiate for the highest data rate that is supported by both transceivers 15 and 55 and that results in an acceptable signal quality, as indicated by a particular parameter, such as signal-to-noise ratio (SNR). In negotiating the data rate, the transceivers 15 and 55 assign a constellation density to each tone communicated across the subscriber line 29. As known in the art, the constellation density for a given tone represents the number of bits carried by each symbol of the tone. A higher constellation density means that each symbol carries more bits resulting in a higher data rate for the tone. Moreover, assigning the constellation density to a tone effectively sets the data carrying capacity for that tone.

Note that the assignment of constellation density (referred to as constellation encoding) is performed tone-by-tone. That is, an SNR measurement is performed for each tone, and the SNR measured for a given tone is used to select the appropriate constellation density for that tone. Thus, different tones may be assigned different constellation densities and, hence, can support at different data rates. The aggregate data rate for all of the tones generally represents the overall data rate for the DMT signal.

During training, a given transceiver 55 defines and stores in memory data 166 (FIG. 3), referred to hereafter as "constellation density settings 166." Such settings 166 indicate the constellation densities that are assigned to each tone and are used by the transceiver 55 in formatting the data signals communicated by it. In this regard, the transceiver 55 is configured to control the constellation densities of the communicated tones so they are in accordance with the stored constellation density settings 166. Over time, as conditions on the line change, the transceiver 55 may update the constellation density settings 166 that were originally established during training. In general, such updates are usually gradual and in response to changes in a measured performance parameter, such as SNR. For example, if the SNR for a given tone increases, the constellation density for that tone may be increased, and conversely, if the SNR decreases, the constellation density for that tone may be decreased. As long as the changes in line conditions are gradual, such updates can be successfully performed without requiring a retrain. However, if a line event causes a significant, abrupt change in line conditions, such as the amount of noise affecting the communicated signals, the transceiver 55 may be unsuccessful in adapting to the changed line conditions requiring a retrain in order to re-establish communication with the far-end CP transceiver 15.

Figure 3:
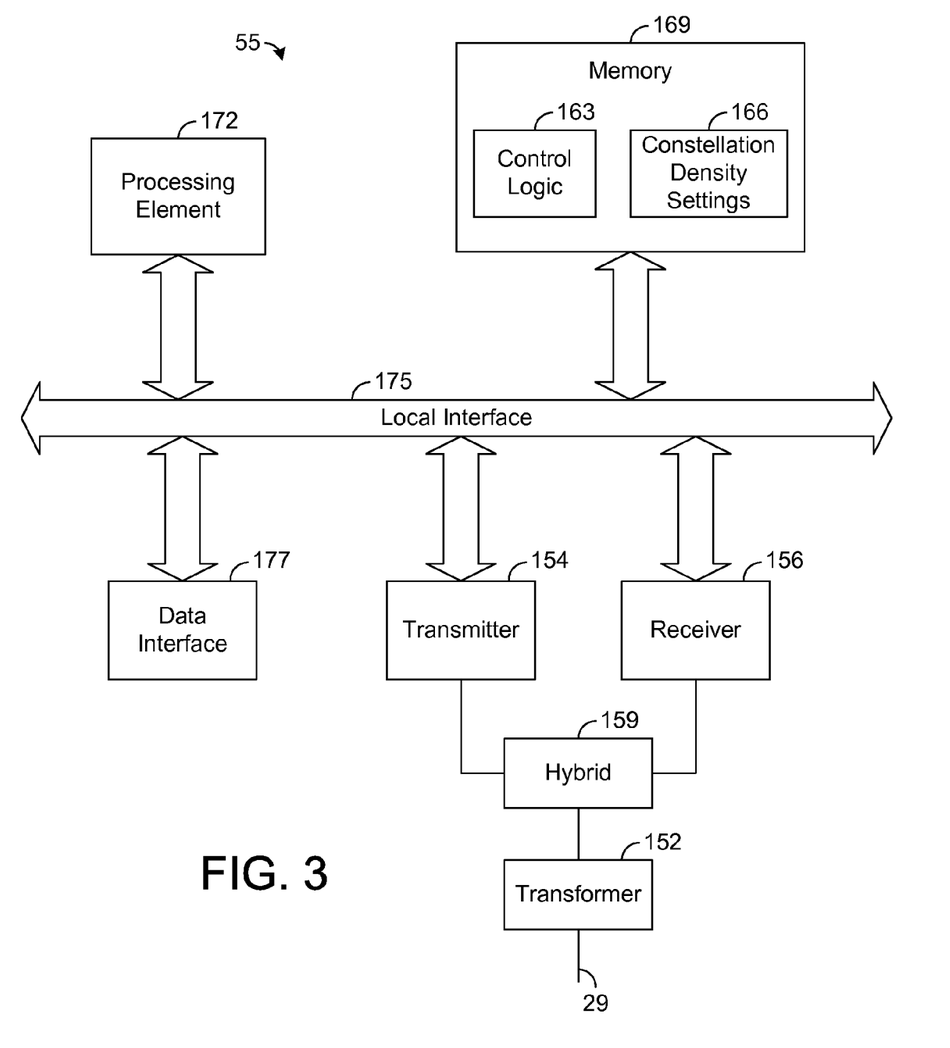
FIG. 3 is a block diagram illustrating an exemplary embodiment of a transceiver, such as is depicted by FIG. 2.

FIG. 3 depicts an exemplary embodiment of a transceiver 55. As shown by FIG. 3, the transceiver 55 comprises a transformer 152 that is coupled to a subscriber line 29 (FIG. 2). The transformer 152 is coupled to a transmitter 154 and a receiver 156 through a hybrid 159. The transmitter 154 transmits a DMT signal (e.g., VDSL signal), which is converted by transformer 152 to a voltage level suitable for communication across the subscriber line 29 coupled thereto. When a DMT signal is received from the subscriber line 29, the transformer 152 converts the line voltage to a matching signal before passing it to the receiver 156. The hybrid 159 separates the transmitted signals from the received signals in an attempt to keep energy from the transmitter 154 from affecting the signals received by the receiver 156.

As shown by FIG. 3, the transceiver 55 comprises control logic 163 for generally controlling the operation of the transceiver 55. For example, the control logic 163 communicates with the vector logic 77 (FIG. 2) and also controls (e.g., establishes and updates) constellation density settings 166 stored in memory 169. It should be noted that the control logic 163 can be implemented in software, hardware, firmware, or any combination thereof. In the exemplary embodiment illustrated in FIG. 3, the control logic 163 is implemented in software and stored in the memory 169.

Note that the control logic 163, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the transceiver 55 depicted by FIG. 3 comprises at least one conventional processing element 172, such as a digital signal processor (DSP) or a central processing unit (CPU), that communicates with and/or drives the other elements within the transceiver 55 via a local interface 175, which can include at least one bus. Furthermore, the transceiver 55 comprises a data interface 177 for enabling the control logic 163 to communicate with external components and/or devices. As an example, the data interface 177 is coupled to the control element 63 (FIG. 2) and vector logic 77 (FIG. 2) for enabling the control logic 163 to communicate with such components.

In one exemplary embodiment, the control logic 163 of each transceiver 55 is configured to determine when any of the tones communicated by such transceiver 55 are affected by an amount of alien noise, such as RFI, in excess of a threshold, referred to hereafter as "noise threshold." Alien noise generally refers to any interference that couples into a subscriber line 29 from a source external to the vectoring group for which the subscriber line 29 is a member.

For tones affected by alien noise in excess of the noise threshold, it is likely that vectoring actually reduces rather than increases signal quality. In this regard, vectoring generally lowers the overall noise floor making alien noise more significant in terms of overall signal quality. It has been observed that the presence of alien noise has a detrimental effect on the accuracy of the vectoring coefficients. In particular, as described above, the vector logic 77 (FIG. 2) adapts the vectoring coefficients over time in order to accommodate changing noise conditions. When alien noise is corrupting a tone, the vector logic 77 essentially attempts to adjust the tone's vectoring coefficients to cancel all noise, including alien noise. However, some forms of alien noise, such as RFI, cannot be reliably cancelled by vectoring. When there is a significant presence of alien noise, it is likely that vectoring operations introduce a relatively significant amount of noise and actually reduce overall signal quality. Thus, as will be described in more detail hereafter, the control logic 163 determines when the amount of alien noise affecting a given tone exceeds the noise threshold, and during such times, the control logic 163 disables vectoring operations for the tone.

Note that there are a variety of techniques that can be used to determine when alien noise affecting a tone exceeds a threshold. In one exemplary embodiment, the control logic 163 is configured to perform a spectral analysis of the subscriber line 29 during a quiet period or, in other words, when the transceivers 15 and 55 of the vectoring group are not transmitting across the lines 29. Such a quiet period could occur during training or at some other time. In one exemplary embodiment, the control logic 163 of each transceiver 55 of the vectoring group coordinates with one another via a control channel in order control the timing of their communication so that each transceiver 55 is aware when a quiet period begins and ends. The control logic 163 of each transceiver 55 also coordinates with its respective CP transceiver 15 (FIG. 1) via a control channel to ensure that each transceiver 15 and 55 of the vectoring group is not transmitting during the quiet period.

Since data communication is not occurring during a quiet period, any energy detected from a subscriber line 29 during the quiet period is from an interferer. The control logic 163 of each transceiver 55 in the vectoring group is configured to analyze the spectrum detected during the quiet period. For each tone, the control logic 163 determines whether the spectrum exceeds the noise threshold in the tone's frequency range. If so, then the control logic 163 determines that a significant amount of alien noise is present in the frequency range of the tone such that it is desirable to exclude the tone from vectoring, as will be described in more detail hereafter.

For each tone that is identified by the control logic 163 for vectoring exclusion, the control logic 163 instructs the vector logic 77 to disable vectoring for such tone. As an example, the control logic 163 may transmit a message identifying each tone that it has selected for vectoring exclusion. In response, the vector logic 77 refrains from performing vectoring operations for the identified tones, which will be referred to hereafter as the "excluded tones." Note that an occurrence of alien noise often spans across the frequency ranges of multiple tones. Thus, the tones are expected to be excluded in groups of contiguous tones, referred to herein as "exclusion zones."

For the excluded tones transmitted or received by a given transceiver 55, the control logic 163 of such transceiver 55 continues to send symbols of the excluded tones to the vector logic 77, which uses such symbols in the vectoring operations for other symbols communicated by the vectoring group. As an example, the vector logic 77 may use the symbol of an excluded tone to cancel crosstalk induced by such tone and affecting another symbol received by the card 51 from the subscriber lines 29, or the vector logic 77 may use the symbol of the excluded tone to precode another symbol, depending on whether the symbol of the excluded tone is received by or transmitted from the transceiver 55.

However, as instructed by the control logic 163, the vector logic 77 does not attempt to perform vectoring in order to compensate the symbol of an excluded tone for crosstalk. Indeed, for a symbol of an excluded tone sent by the control logic 163 of a transceiver 55 to the vector logic 77, the control logic 163 further processes the symbol of the excluded tone without any attempt to remove crosstalk from the processed symbol or precode the symbol via vectoring. As an example, if the symbol is received by the card 51 from the subscriber line 29, the control logic 163 may decode the symbol to recover the data represented by it without the vector logic 77 modifying the symbol. If the symbol is to be transmitted across the subscriber line 29 from the card 51, the control logic 163 may modulate the excluded tone with the symbol without the vector logic 77 modifying the symbol. In either case, the symbol is further processed by the control logic 163 without vectoring operations being performed on it.

The alien noise affecting a given tone typically varies over time. In one exemplary embodiment, the control logic 163 is configured to monitor the alien noise for each tone over time, and to appropriately change which tones are excluded from vectoring as the noise conditions change. For example, if the alien noise for an excluded tone falls below the noise threshold during a later quiet period, the control logic 163 may be configured to enable vectoring for the tone such that the tone is compensated for crosstalk.

As indicated above, vectoring generally reduces the overall noise floor for signals communicated within a vectoring group. Thus, vectoring often allows for a higher data rate than would otherwise be possible in the absence of vectoring. In this regard, constellation densities are generally higher for tones for which vectoring operations are performed to reduce crosstalk. If vectoring is disabled for a given tone, then the tone's current constellation density is likely too high for communication after the vectoring is disabled. That is, after excluding a tone from vectoring, continued communication with the same constellation density likely will result in a relatively high number of transmission errors such that a smaller constellation density is desirable.

In one embodiment, when the control logic 163 determines to exclude a particular tone from vectoring, the control logic 163 is configured to also reduce the tone's constellation density, thereby reducing the tone's data rate. Accordingly, the constellation density is likely set to a level more conducive for the characteristics of the communication channel after the vectoring exclusion. To coordinate the change in constellation density with the CP transceiver 15 at the opposite end of the subscriber line 29, the control logic 163 may communicate with such CP transceiver 15 via a control channel.

There are various techniques that could be used to select a lower constellation density after a tone is excluded from vectoring. As an example, all excluded tones could be set to the same predefined constellation density. In one exemplary embodiment, the lower constellation density for a given tone is selected during training. In this regard, during training, training signals are preferably exchanged while vectoring is being performed in order to select the constellation densities for the data phase. However, training signals are also exchanged while vectoring is disabled for all tones in another phase of training, referred to hereafter as the "vectoring disabled phase."

Constellation densities are then selected for each tone based on the training signals communicated in the vectoring disabled phase. Since vectoring is not being used in such phase, it is expected that smaller constellation densities will be selected. The control logic 162 is configured to store in the constellation density settings 166 information indicating which constellation densities are selected for which tones in the vectoring disabled phase of training. Later when a given tone is excluded from vectoring during the data phase, the control logic 163 accesses the constellation density settings 166 to determine the constellation density selected for such tone in the vectoring disabled phase of training. The control logic 163 selects such constellation density for the tone in the data phase after disabling vectoring for this tone. In other embodiments, other techniques for selecting a reduced constellation density for an excluded tone are possible.

It should be noted that interpolation is sometimes used in vectoring in order to reduce the calculations that the vector logic 77 performs. In this regard, the vector logic 77 calculates vectoring coefficients using a vectoring algorithm for only some of the tones that are communicated by a particular transceiver 55. As an example, the vector logic 77 might divide the communicated frequency spectrum into a plurality of equally spaced bands, referred to hereafter as "interpolation bands," in which each interpolation band represents a plurality of contiguous tones. Rather than calculating vectoring coefficients based on a vectoring algorithm for each tone of an interpolation band, the vector logic 77 calculates vector coefficients according to a vectoring algorithm for only the tones at the band boundaries. As an example, if $tone_n$ and $tone_{n+8}$ are at the boundaries of a given interpolation band, then the vector logic 77 calculates vectoring coefficients according to a vectoring algorithm for $tone_n$ and $tone_{n+8}$, referred to hereafter as the "end tones." Thus, the vectoring coefficients for the end tones are adaptively updated based on error signals determined by decoding the symbols of the end tones.

In such an example, however, the vector logic 77 does not calculate vectoring coefficients according to a vectoring algorithm for the tones in between the end tones (i.e., for $tone_{n+1}$, $tone_{n+2}$, $tone_{n+3}$, $tone_{n+4}$, $tone_{n+5}$, $tone_{n+6}$, and $tone_{n+7}$), referred to hereafter as the "intermediate tones." Thus, the vectoring coefficients for these intermediate tones are not adaptively updated based on error signals determined by decoding the symbols of the intermediate tones. Instead, the vectoring coefficients for the intermediate tones are interpolated based on the vectoring coefficients of the end tones. Such interpolation is well known and used extensively in the art.

In one exemplary embodiment, if any of the end tones are excluded from vectoring, then the intermediate tones whose coefficients would otherwise be interpolated from the coefficients of such end tone are excluded from vectoring as well, even if the alien noise measured for such intermediate tones does not exceed the noise threshold. For example, if $tone_{n+8}$ in the above example is excluded from vectoring based on the extent to which alien noise is determined to affect such tone, then the control logic 163 is preferably configured to exclude the intermediate tones as well (i.e., $tone_{n+1}$, $tone_{n+2}$, $tone_{n+3}$, $tone_{n+4}$, $tone_{n+5}$, $tone_{n+6}$, and $tone_{n+7}$), even if the measured alien noise for each of these intermediate tones does not exceed the noise threshold. Further, the control logic 163 preferably reduces the constellation density for such excluded intermediate tones, as described above. Note that the control logic 163 can be configured with the knowledge of the interpolation algorithm so that it is aware of which of the tones are intermediate. Alternatively, the control logic 163 may communicate with the vector logic 77 to learn such information.

In various embodiments described above, alien noise is detected by the transceivers 55 during quiet periods. However, other techniques for determining the extent to which alien noise is likely affecting a given tone are also possible. As an example, alien noise for various frequency ranges may be measured by a system external to the vectoring group, and the results of such measurements may be reported to the control logic 163. In one exemplary embodiment, alien noise is predicted based on data indicating transmission schedules of known interferers, such as amplitude modulated (AM) radio stations in close proximity to the subscriber lines 29. In such an embodiment, the control logic 163 receives a signal indicating when alien noise for at least one frequency range is expected to exceed a threshold level, and the control logic 163 determines whether to exclude a tone or tones in such frequency range based on the signal. Commonly-assigned U.S. patent application Ser. No. 12/950,377, entitled "Systems and Methods for Mitigating Radio Frequency Interference" and filed on Nov. 19, 2010, which is incorporated herein by reference, describes exemplary techniques for predicting occurrences of alien noise. In addition, it should be noted that it is unnecessary for the control logic 163 and/or the vector logic 77 to reside on the same line card 51 as the other components of the transceivers 55. Various other changes and modifications would be apparent to a person of ordinary skill upon reading this disclosure.

An exemplary use and operation of one of the transceivers 55 in selectively excluding tones from vectoring will be described in more detail below with particular reference to FIG. 4. For illustrative purposes, assume that the vector logic 77 is configured to calculate vectoring coefficients for the end tones of a pair of successive interpolation bands and to interpolate the vectoring coefficients of the tones in between. In particular, assume that the vector logic 77 calculates vectoring coefficients according to a vectoring algorithm for $tone_n$, $tone_{n+8}$, and $tone_{n+16}$. Further assume that the vectoring coefficients for intermediate tones between $tone_n$ and $tone_{n+8}$ (i.e., for $tone_{n+1}$, $tone_{n+2}$, $tone_{n+3}$, $tone_{n+4}$, $tone_{n+5}$, $tone_{n+6}$, and $tone_{n+7}$) are interpolated based on the vectoring coefficients for $tone_n$ and $tone_{n+8}$, and the vectoring coefficients for intermediate tones between $tone_{n+8}$ and $tone_{n+16}$ for $tone_{n+9}$, $tone_{n+10}$, $tone_{n+11}$, $tone_{n+12}$, $tone_{n+13}$, $tone_{n+14}$, and $tone_{n+15}$) are interpolated based on the vectoring coefficients for $tone_{n+8}$ and $tone_{n+16}$.

Figure 4:
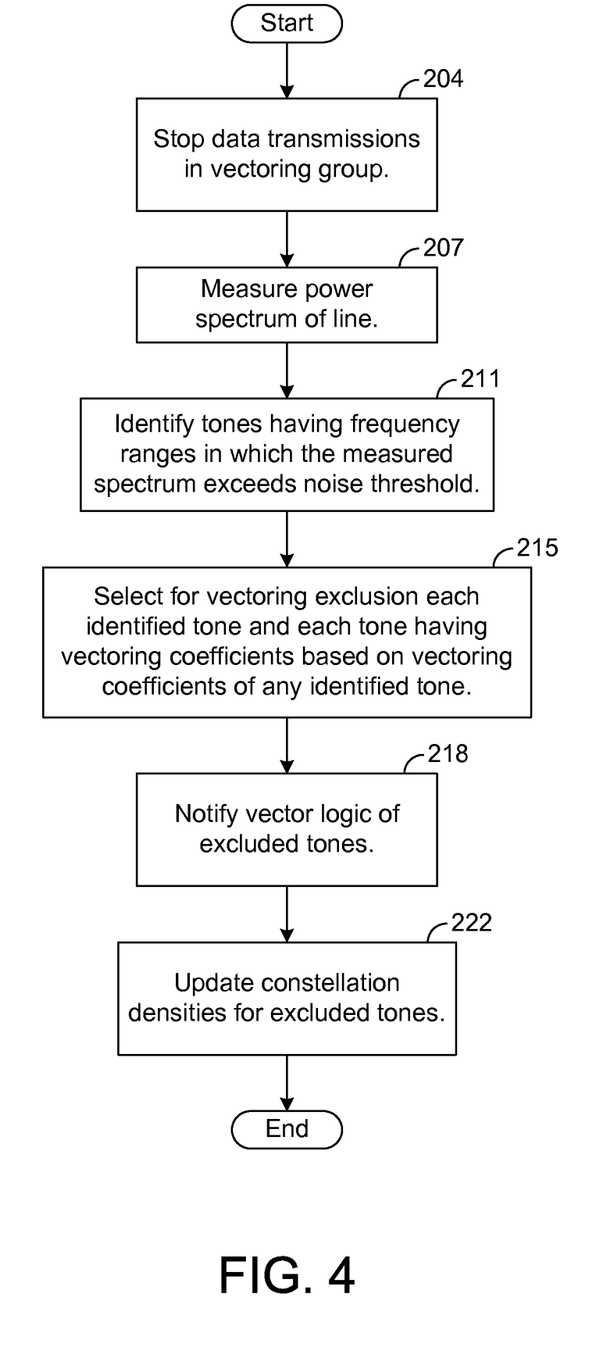
FIG. 4 is a flowchart illustrating an exemplary method of excluding tones from vectoring operations.

Either during training or a subsequent data phase, transceivers 15 and 55 of a vectoring group associated with the vector logic 77 enter a quiet period in which the transceivers 15 and 55 do not communicate across the subscriber lines 29, as shown by block 204 of FIG. 4. During such quiet period, the control logic 163 of each transceiver 55 measures power from its respective subscriber line 29 across a range of frequencies for the tones communicated by the transceivers 55, as shown by block 207 of FIG. 4. The control logic 163 of each transceiver 55 then analyzes the power measurements from the quiet period to identify tones that have frequency ranges in which the measured power exceeds the noise threshold, as shown by block 211 of FIG. 4. For illustrative purposes, during the measurement, assume that an occurrence of alien noise greater than the noise threshold spans across the frequency range from $tone_{n+7}$ to $tone_{n+14}$ causing the control logic 163 of one of the transceivers 55 to identify in block 211 $tone_{n+7}$, $tone_{n+8}$, $tone_{n+9}$, $tone_{n+10}$, $tone_{n+11}$, $tone_{n+12}$, $tone_{n+13}$, and $tone_{n+14}$.

In block 215 of FIG. 4, the control logic 163 of such transceiver 55 selects all of the identified tones for vectoring exclusion. However, the control logic 163 also selects for vectoring exclusion each tone having vectoring coefficients that are interpolated based on the vectoring coefficients of any excluded tone. Since the vectoring coefficients for $tone_{n+1}$ through $tone_{n+6}$ are interpolated from the vectoring coefficients of $tone_{n+8}$, which is excluded from vectoring, the control logic 163 also selects $tone_{n+1}$, $tone_{n+2}$, $tone_{n+3}$, $tone_{n+4}$, $tone_{n+5}$, and $tone_{n+6}$ for vectoring exclusion in block 215. Further, since the vectoring coefficients for $tone_{n+15}$ are interpolated from the vectoring coefficients of $tone_{n+8}$, which is excluded from vectoring, the control logic 163 also selects $tone_{n+15}$ for vectoring exclusion in block 215. $tone_n$ and $tone_{n+16}$, however, are not selected for vectoring exclusion.

As shown by block 218, the control logic 163 notifies the vector logic 77 of the exclusion zone spanning from $tone_{n+1}$ to $tone_{n+15}$. In response, the vector logic 77 stops performing vector operations for tones within the exclusion zone. In one exemplary embodiment, the control logic 163 continues passing symbols of the tones in the exclusion zone to the vector logic 77, which may use such tones to cancel crosstalk affecting other tones, and the vector logic 77 passes the symbols of the tones in the exclusion zone back to the control logic 163 as it would normally do when performing vectoring for such tones. However, the symbols of the tones in the exclusion zone are passed back to the control logic 163 unmodified. That is, the vector logic 77 refrains from adjusting the symbols in an effort to compensate for crosstalk.

In addition, as shown by block 222 of FIG. 4, the control logic 163 also updates the constellation densities for the tones in the exclusion zone. Specifically, the control logic 163 reduces the constellation densities, thereby reducing the data rates for these excluded tones.

Now, therefore, the following is claimed:

1. A discrete multi-tone (DMT) communication system, comprising:
    a plurality of transmitters coupled to a plurality of subscriber lines;
    a plurality of receivers coupled to the plurality of subscriber lines;
    vector logic configured to receive symbols of tones communicated across the subscriber lines, the tones including at least a first tone and a second tone, the vector logic configured to perform vectoring for each of the tones, thereby adjusting the symbols based on vectoring coefficients to compensate the symbols for crosstalk; and
    control logic configured to measure a parameter indicative of alien noise from one of the subscriber lines, the control logic further configured to disable the vectoring for at least the first tone based on the parameter.

2. The system of claim 1, wherein the control logic is configured to perform a comparison between the parameter and a threshold and to disable the vectoring for the first tone in response to the comparison.

3. The system of claim 1, wherein the vector logic is configured to calculate a first vectoring coefficient for the first tone and to interpolate a second vectoring coefficient for the second tone based on the first vectoring coefficient, and wherein the control logic is configured to disable the vectoring for the second tone based on whether the second vectoring coefficient is interpolated from the first vectoring coefficient.

4. The system of claim 1, wherein the control logic is configured to adjust a constellation density for the first tone based on the parameter.

5. A discrete multi-tone (DMT) system, comprising:
    a plurality of transmitters coupled to a plurality of subscriber lines;
    a plurality of receivers coupled to the plurality of subscriber lines; and
    logic configured to measure a parameter indicative of alien noise from one of the subscriber lines, the logic further configured to determine, based on the parameter, whether to perform vectoring on a symbol for a first tone communicated across the one subscriber line.

6. The system of claim 5, wherein the logic is configured to perform the vectoring on the symbol in response to a determination that the alien noise is below a threshold.

7. The system of claim 5, wherein the logic is configured to refrain from performing the vectoring on the symbol in response to a determination that the alien noise exceeds a threshold.

8. The system of claim 5, wherein the logic is configured to exclude the first tone from the vectoring based on the parameter, and wherein the logic is configured to exclude from the vectoring a second tone communicated across the one subscriber line based on exclusion of the first tone from the vectoring and based on whether a vectoring coefficient for the second tone is based on a vectoring coefficient for the first tone.

9. The system of claim 5, wherein the logic is configured to adjust a constellation density for the first tone based on the parameter.

10. The system of claim 5, wherein the logic is configured to perform the vectoring on the symbol for the first tone and to subsequently disable vectoring for the first tone based on the parameter.

11. A method for use in a discrete multi-tone (DMT) system, comprising:
    communicating a first plurality of tones across a first subscriber line, the first plurality of tones including at least a first tone and a second tone;
    communicating a second plurality of tones across a second subscriber line;
    performing vectoring for the first and second plurality of tones thereby compensating symbols of the first and second plurality of tones for crosstalk;
    determining an extent to which alien noise is affecting the first tone; and
    disabling the vectoring for the first tone based on the determining.

12. The method of claim 11, wherein the determining comprises:
    measuring a parameter indicative of the alien noise; and
    comparing the parameter to a threshold.

13. The method of claim 11, further comprising:
    determining whether a vectoring coefficient for the second tone is based on a vectoring coefficient for the first tone; and
    disabling the vectoring for the second tone based on the determining whether the vectoring coefficient for the second tone is based on the vectoring coefficient for the first tone.

14. The method of claim 11, further comprising adjusting a constellation density for the first tone based on the determining.

15. The method of claim 11, wherein the performing comprises performing the vectoring for the first tone prior to the disabling.

16. The system of claim 15, wherein the logic is configured to disable vectoring for the first tone based on a comparison of the parameter to a threshold.

* * * * *